United States Patent [19]

Elpiner

[11] Patent Number: 4,590,576
[45] Date of Patent: May 20, 1986

[54] CONTROL SYSTEM FOR FLOW CONTROL VALVES

[75] Inventor: Boris Elpiner, Northbrook, Ill.

[73] Assignee: Mark Controls Corporation, Evanston, Ill.

[21] Appl. No.: 634,646

[22] Filed: Jul. 26, 1984

[51] Int. Cl.$^4$ ............................................. G06F 15/00
[52] U.S. Cl. ................................. 364/510; 364/138; 239/67; 137/624.11
[58] Field of Search ..................... 364/138, 420, 510; 239/67–70; 137/2, 624.11–624.15

[56] References Cited

U.S. PATENT DOCUMENTS 4,200,911  4/1980  Matsumoto ........................ 364/510
4,217,647  8/1980  Sjoholm ........................... 137/624.11
4,502,842  4/1985  Currier ............................ 364/510

*Primary Examiner*—Jerry Smith
*Assistant Examiner*—Allen MacDonald
*Attorney, Agent, or Firm*—Welsh & Katz, Ltd.

[57] ABSTRACT

A method and apparatus for controlling the flow variables of a control system by sensing selected pneumatic parameters while operating the control system within maximum power consumption constraints. The control system includes a processor for selecting a first flow valve for movement during one duty cycle in one selected direction. The processor then selects for operation additional numbers of flow valves less than the maximum number of valves, drives the valves in the same direction as the first valve for the remainder of the duty cycle. The number of additional flow valves operated in any given duty cycle is determined by maximum power constraints. Calibration of each of the flow valves is accomplished driving each valve to an end point using less than the normal number of power phases to reduce the torque applied to the valve mechanism.

25 Claims, 7 Drawing Figures

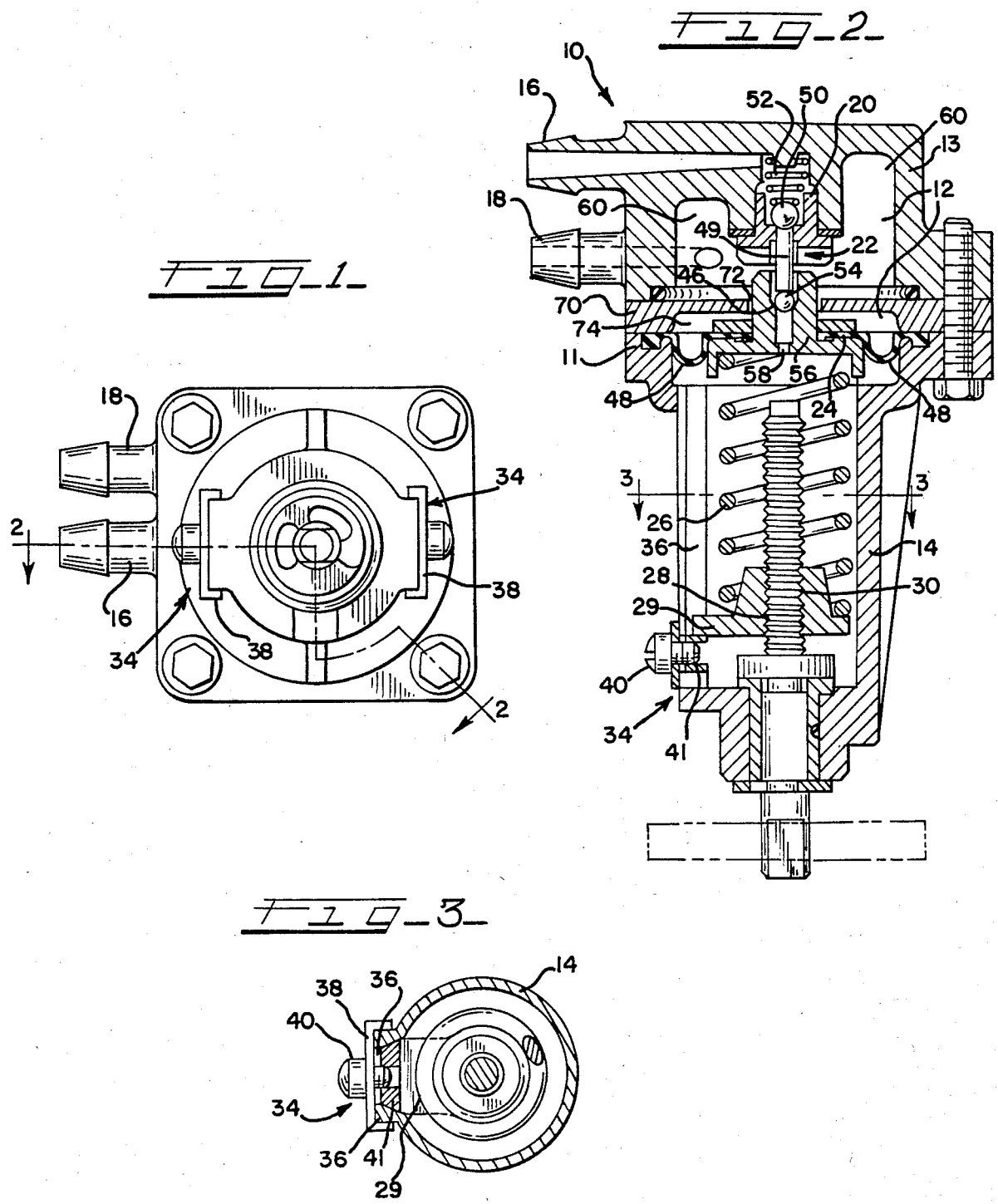

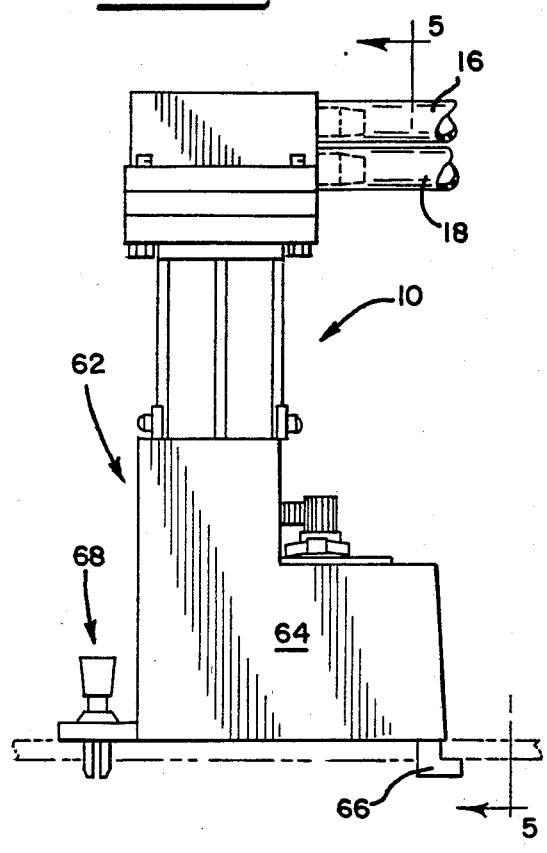
Fig_4_
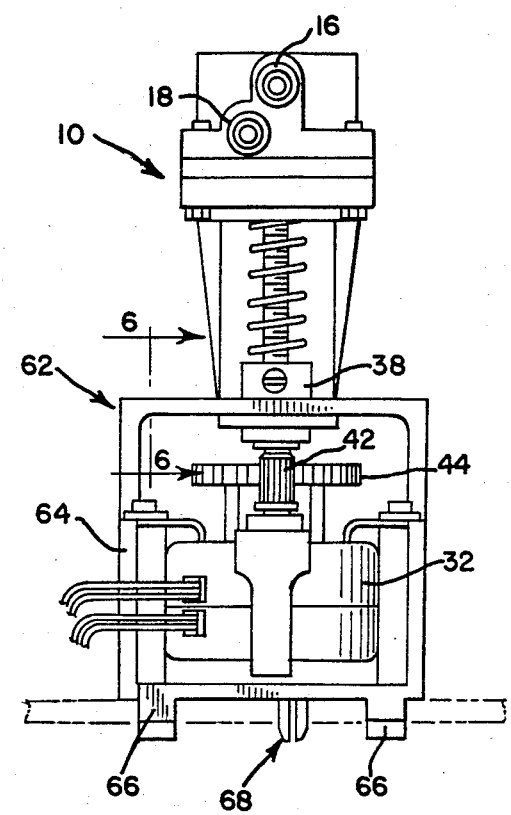
Fig_5_
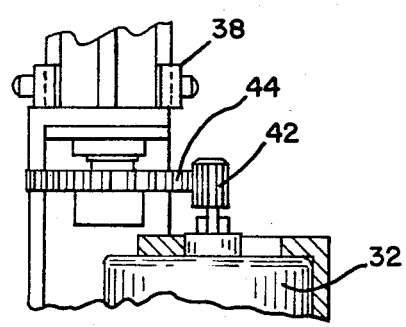
Fig_6_

CONTROL SYSTEM FOR FLOW CONTROL VALVES

The present invention relates to a system for controlling flow variables of a pneumatic system. More particularly, the invention relates to a system for controlling pneumatic system variables by selecting and moving certain ones of a plurality of valves responsive to sensed pneumatic parameters and doing so in a way which provides minimum system disruption while operating the control system within maximum power consumption limits.

Previous flow control systems have suffered from certain deficiencies and limitations. In particular, many systems have operated flow control valves sequentially and individually which produces marked system disruption. Further, many previous control systems have required separate power supplies for operation of the flow valves which has increased the total system cost.

Accordingly, a general object of the present invention is to provide an improved pneumatic control system.

Another object of the invention is to provide an improved system for controlling variables of a pneumatic system by minimizing disruption of system pneumatic variables by selectively grouping flow valves for movement in such a way that maximum power consumption limits are not exceeded.

A more specific object is to provide an improved system for controlling variables of a pneumatic system wherein system pneumatic disruption is minimized by grouping the operation of valves that move in the same direction and by alternating operation of oppositely moving valves in successive duty cycles.

A further object is to provide a system for calibrating each of the flow valves without causing damage by driving each motor to a known end point by using a less than the normal number of phases to reduce the driving torque of the valve motor.

Further objects and advantages of the present invention will become apparent from reading the following detailed description of the inventidn, which referring to the accompanying drawings, wherein:

FIG. 1 is a top view of the valve body;

FIG. 2 is a view of a cross section taken generally along line 2—2 shown in FIG. 1; and FIG. 3 is a bottom view of the valve body;

FIG. 4 is a side view of the valve mounted in a containment housing;

Figure 7:
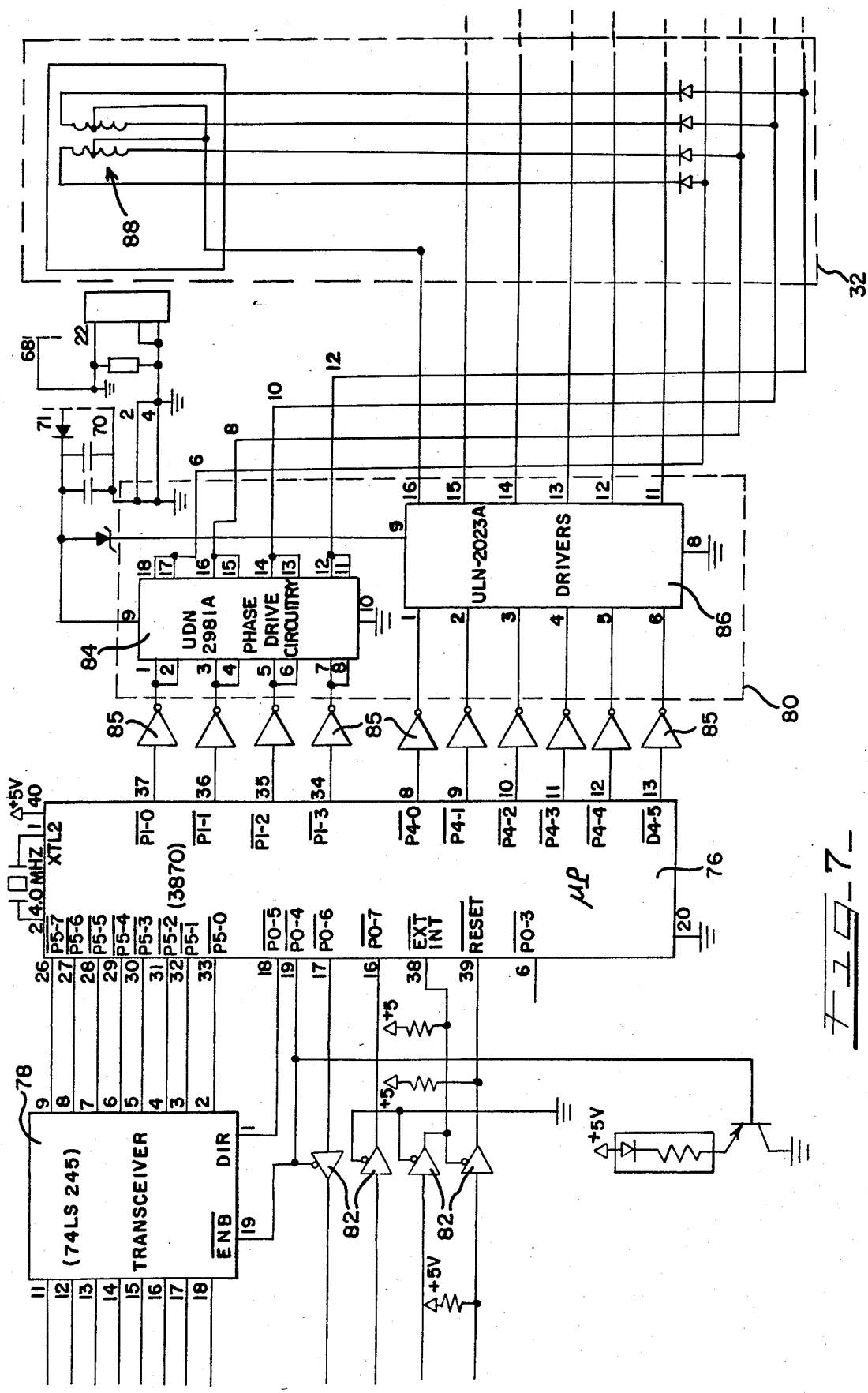

FIG. 5. is a front view taken along line 5—5 shown in FIG. 4;

FIG. 6 is a fragmentary sectional view taken along line 6—6 shown in FIG. 5; and FIG. 7 is an electrical schematic circuit diagram of the microprocessor-based control system for a plurality of valves.

DETAILED DESCRIPTION

Broadly stated, the present invention comprises a system for controlling pneumatic variables, such as pressure and flow rate, using a plurality of motor driven force balance valves which are responsive to pneumatic parameters. The invention has advantages which include the ability to change the pneumatic variables in the system while minimizing system disruption. The invention performs such control in a way whereby power consumption is maintained within predetermined limits, which may obviate the need for an additional or separate power supply for powering the motor driven valves.

Control of the pneumatic system is manifested through a plurality of motor driven pressure control valves. Each valve has a valve body with a chamber, and the valve body has at least one valve seat which is selectively opened and closed on the fluid supply side. In one form of the valve, a return valve vent seat is also provided which can be selectively opened and closed on the fluid return side to enable the venting of the desired levels of fluid to the atmosphere.

The valve includes a fluid force sensing means, comprising a diaphragm, for sensing the pressure induced forces within the valve body chamber and a valve closure means coupled to the diaphragm. The valve closure means includes a ball valve assembly with a ball on at least one end of a rod, and preferably has balls on opposite ends of the rod, which enable the opening or closing of the valve seats. The gas pressure forces exerted on the diaphragm are balanced by an adjustable force means, such as a spring mechanism, which exerts an opposing force on the opposite side of the diaphragm, to establish a preselected limit of gas pressure within the valve body chamber. The degree of displacement of the spring mechanism is readily set by a movable follower means operably coupled to a journaled, rotatable shaft driven by a motor. The follower means is driven to a predetermined location and movement beyond that location is prevented by a positionable stop means. When the follower encounters the stop means, the follower is prevented from further displacement of the spring and thus the fluid pressure forces balance the fixed spring force, leading to a fixed fluid flow pressure.

Hereinafter, reference will be made to control of flow pressure only for gases, but it is to be understood that the invention can also be used to control flow pressure of fluids such as gas-vapor mixtures (for example, steam-water vapor mixtures) provided the valve is constructed of materials appropriate to withstand the particular chemical, mechanical and thermal environment as well as other effects to which it is exposed. Additionally, normal operation of the valve provides for exhausting of the fluid to the exterior of the valve. If the fluid is a liquid, care should be taken to contain the exhausted fluid so that it does not detrimentally affect either the immediate area or other components of the valve. If the fluid is a gas other than air, containment or exhausting of the gas from the local environment may also be required.

Referring now to the drawings, FIGS. 1-6 illustrate one embodiment of the flow pressure control valve used in the present invention, indicated generally at 10 in FIG. 2, which has a valve body 11 with a chamber 12. The valve body 11 includes an upper valve housing 13 and a lower valve housing 14. The lower valve housing 14 includes a gas supply port 16, a gas return port 18, a supply valve seat 20, and a ball valve assembly 22 which is selectively moved to open and close the supply valve seat 20. The valve 10 further includes a pressure-force sensing means, preferably a flexible diaphragm 24, for sensing the inlet gas pressure in the valve body 11. The upper valve housing 13 includes adjustable force applying means, which is preferably a compressed helical spring 26, for exerting a balancing force on the diaphragm 24 to balance gas pressure forces exerted thereon. The spring 26 is positioned by a follower 28 which is selectively moved toward or away from the diaphragm 24 to variably adjust the force that is applied to the diaphragm 24 to vary the established balance point. Therefore, a particular gas flow pressure value is established in the valve body which produces a proportional gas flow output pressure through the return port 18.

The follower means 28, having a threaded aperture therethrough, engages the threads on a shaft 30 which is journaled for rotation. The follower 28 moves axially along the length of the rotatable shaft 30 and thus acts to displace the spring 26. The shaft 30 is rotated by drive means, such as a motor drive 32 which can be controlled by processor means, such as a microprocessor and associated circuitry. Details of the control of the motor drive 32 will be discussed in more detail hereinafter.

Any one of various preselected gas pressure set points and/or gas pressure calibration points is set by a positionable stop, indicated generally at 34, which prevents movement of the follower 28 beyond a predetermined location. In order to mount the positionable stop 34, the upper valve housing 13 shown in FIG. 2 includes at least one slot 36 which is shown in detail in FIG. 3. The stop 34 mounted to the slot 36 includes at least a first stop positionable to prevent movement of the follower 28 beyond a predetermined location along the slot 36. The follower 28 has an ear portion 29 which extends substantially perpendicular to the shaft 30 into the slot 36. In the illustrated embodiment, a slot bracket 38 has a screw 40 which extends through an aperture in the bracket 38. The screw 40 engages a stop member 41 which intersects the path of travel of the ear portion 29 and blocks the follower 28, preventing travel beyond the predetermined location in the slot 36. The screw 40 threadedly engages the stop member 41 and is selectively rotated to tighten or loosen the stop 34. When tightened, the screw 40 pulls the stop member twoard the bracket 38. As best shown in FIG. 3, because of the angles of the contacting surfaces of the stop member 41 and the slot 36, tightening the screw 40 pulls the stop member 41 into close contact which keeps it from moving when the ear portion 29 comes in contact with it.

One of a number of different stops 34 can be attached to the bracket 38, for example, a bolt threadedly engaged with the bracket 38. The bracket 38 is then positioned at the desired location along the slot 36, and the bolt of the bracket 38 is extended to prevent movement of the follower 28 by blockingly encountering the ear portion 29 of the follower 28 as shown in FIG. 2. The slot 36 can also have precalibrated indicator marks along its length to enable selection of various desired gas pressure output values, if desired.

In another form of the valve, a plurality of the stops 34 are attached to the slot 36 in order to stop or block the movement of the follower 28 at a predetermined location. By fixing this location for the follower 28, the magnitude of the force exerted by the spring 26 is set to a preselected level. As indicated hereinbefore this preselected force level also yields a preselected limit on the gas flow pressure in the valve body chamber. One of the protrusions 40, such as the above mentioned bolt which is threadedly engaged with the bracket 38, then blocks the path of the follower 28 to establish a preselected upper or lower limit of gas flow pressure.

A plurality of the stops 34 can also be used to increase the number of selectable gas pressure limits. By using threaded bolts to stop the follower 28, one selects the desired stop by driving one bolt into the path of travel of the ear portion of the follower 28. The maximum number of the stops 34 which can be mounted on the valve body is determined by how many are positionable along the slot 36. Alternatively, one long slot bracket can extend the length of the upper housing 13 and a plurality of the bolts can be threadedly engaged with such a slot bracket to provide a plurality of stops for the follower 28.

Additional numbers of the stops 34 are also positionable along additional ones of the slots 36 located on the upper valve housing 13. For example, a plurality of the stops 34 positioned along four different ones of the slots 36 provide a factory preset range of 1 to 15 psi pressure within the valve body chamber in increments of fractions of 1 psi. In another version of the valve, the additional ones of the stop 34 enable the user to select any desired intermediate pressure limit, as well as the factory preset selection of stops for preselected gas pressure limits.

Control of the gas pressure is therefore initiated through displacement of the follower 28 by the rotatable shaft 30. In order to enable ease of movement of the follower 28 and to extend the life of the adjustable force means, a low friction material is preferred for use in the construction of the follower 28, such as delrin or teflon, for example.

Rotational control of the shaft 30 is accomplished by a drive means, such as the low torque motor drive 32 shown in FIGS. 5 and 6. The motor drive 32 is coupled to the shaft 30 by a gear train which includes motor drive gear 42 and a driven gear 44 threadedly engaged to the shaft 30. A preferred form of the motor drive has a gear reduction ratio of about 4:1 to provide the desired range of movement for altering and setting precise gas pressure values in the range of 1 to 15 psi.

As discussed hereinbefore, the valve 10 achieves the desired gas flow pressure by a force balance method of operation in which gas pressure forces are balanced by adjustable mechanical forces. Control of the gas flow through valve 10 is therefore accomplished by displacement of a valve closure means in conjunction with the process of balancing gas pressure forces with an adjustable mechanical force. In the valve as shown in FIG. 2, the valve closure means is the ball valve assembly 22 which will be discussed in more detail hereinafter. The ball valve assembly 22 is constructed to be displaceable toward or away from engagement with the supply valve seat 20 and with a return valve vent seat 46 (hereinafter the return valve seat 46). The amount of displacement of the ball valve assembly 22 is determined by how large the gas pressure must be to balance the force exerted by the spring 26 which is coupled to the ball valve assembly 22. The displacement of spring 26 is changable to selectively cause opening and closing of gas supply valve seat 20 and the return valve seat 46 to attain the desired gas pressure. In the valve illustrated in FIG. 2, gas pressure forces are exerted on the flexible diaphragm 24 positioned between the upper valve housing 13 and the lower valve housing 14.

In a preferred form of the valve 10, the diaphragm 24 is a flexible membrane having a convoluted or rounded annular surface 48 as shown in FIG. 2. The function of the convoluted surface 48 is to maintain a nearly constant surface area for the flexible membrane when exposed to the gas, regardless of the location of the diaphragm through its extent of travel. The area of the diaphragm 24 is maintained nearly constant by having an unstretched shape surface of large area, such as toroidal or other high surface area shape. Therefore, when the diaphragm moves up or down, the percentage change in surface area is proportionately smaller if the starting area is large. This substantially constant area for the diaphragm 24 insures a proper characterization of the gas pressure on the diaphragm 24 and also insures the proper gas flow pressure through the valve body. The force is the pressure per unit area, and by maintaining a constant area for the diaphragm 24, the gas pressure force varies in direct and linear proportion to pressure. Therefore, as the gas pressure increases, the resulting gas force will not be exaggerated due to a drastically changing surface area for the diaphragm 24. Consequently, a certain percentage change in the force exerted by the spring 26 will be reflected by a known, fixed percentage change in gas flow pressure. For example, if the diaphragm area remains constant, an X percent increase in the spring force might result in a 10 percent increase in gas flow pressure regardless of the pressure level. However, if the surface area of the diaphragm 24 changes sufficiently with a change in gas pressure, an X percent increase in the spring force might result in a 10 percent increase in gas flow pressure at the 1 psi pressure level but in a 15 percent increase at the 10 psi pressure level. The substantially constant surface area exposed to gas pressure thereby results in a linear operation that advantageously corresponds to the linear force that is applied by changing the follower 28 position.

The closure means, such as the ball valve assembly 22 illustrated in FIG. 2, is coupled to the diaphragm 24. The ball valve assembly 22 includes a rod 49 with at least a supply valve ball 50 attached to the supply end of the rod 49 and is selectively engaged and disengaged with the supply valve seat 20. A supply valve spring 52 urges the supply valve ball 50 into engagement with the supply valve seat 20. Other configurations can be used which will effect a closure and which can be coupled to the diaphragm 24 to control gas flow. For example, O-ring gaskets or other gaskets can be engaged to the supply valve seat 20.

In the valve 10 shown in FIG. 2, the other end of the rod 49 has a return valve ball 54 attached thereto and is coupled to the diaphragm 24, which is displaced responsive to gas pressure forces. The return valve ball 54 is selectively engaged and disengaged to the return valve seat 46, as embodied within a piston plate assembly 56 which is coupled to the diaphragm 24. In this form of the valve 10, the diaphragm 24 comprises a rubber material which is in sealing engagement around the piston plate assembly 56 to insure gas flow past the diaphragm 24 only through vent passageway 58. Consequently, depending on the position of the ball valve assembly 22 with respect to the supply valve seat 20 and the return valve seat 46, the supply valve and the vent passageway 58 will be open or closed. For example, if gas pressure is low within inlet chamber 60, the force from the spring 26 is greater than the gas pressure induced force on the diaphragm 24, and the diaphragm 24 is displaced toward the supply valve seat 20. This causes displacement of the ball valve assembly 22, and the supply ball 50 unseats from the supply valve seat 20 whereupon gas enters the inlet chamber 60 through supply port 16. As the gas pressure in the inlet chamber 60 increases, the gas pressure forces opposing the spring forces increase until the forces are balanced. Once the forces are balanced the supply ball 50 again seats to the supply valve seat 20 and gas flow is stopped to the inlet chamber 60.

If on the other hand the gas pressure in the inlet chamber 60 is too high, the diaphragm 24 displaces a sufficient distance to unseat the return valve ball 54, and gas is vented to the atmosphere through the vent passageway 58 in the piston plate assembly 56. Therefore, the position of the ball valve assembly 22 is determined by the balance point which results from gas pressure induced forces and the forces from the adjustable force means, such as the spring 26.

In other forms of the valve 10, the return valve seat 46 can be omitted and replaced with other appropriate venting means. Venting can be accomplished by a spring loaded ball valve vent which is decoupled from the ball valve assembly 22. The desired vent pressure can be selected by using a spring of predetermined compression.

The valve 10 can be mounted for general field use by a housing bracket, indicated generally at 62 in FIGS. 4 and 5. The housing bracket 62 is designed to complement the compact valve size and enable easy installation and removal from a picket board (not shown) for holding a plurality of other such valves. The housing bracket 62 includes a valve containment housing 64 having ear mountings 66 and a snap fastener 68 for quick attachment and removal from the picket board.

Gas flow induced oscillations of the valve 10, and in particular oscillations of the gas flow control elements shown in detail in FIG. 2 (the diaphragm 24, the piston plate assembly 56, and the ball valve assembly 22) are attenuated by a dashpot means which acts to dampen the gas flow within the valve 10. Excessive oscillation of these gas flow control elements can result in large unwanted oscillations in output gas flow pressure. In the form as shown in FIG. 2, the dashpot means comprises a dashpot plate 70 and the coupled piston plate assembly 56 extending through the dashpot plate 70. An annular passageway 72 is formed between the outside cylindrical portion of the piston plate assembly 56 and the vent passageway 58 through the dashpot plate 70. In a preferred form of the dashpot means, the annular passageway 72 is several thousandths to tens of thousandths of an inch in width and acts to restrict gas flow from the inlet chamber 60 into a dampened flow region chamber 74. Moreover, this annular passageway 72 also enables freedom of movement of the piston plate assembly 56 through the dashpot plate 70, and thus allows the diaphragm 24, attached to the piston plate assembly 56, to be responsive to the gas pressure forces and the forces from the spring 26, without introducing extraneous binding or frictional forces.

The attenuation of gas flow induced oscillations of the valve 10 can also be assisted by proper design of other portions of the valve 10. For example, oscillations are also attenuated by using the proper density and mass for the dashpot plate 70 and/or the piston plate assembly 56. The use of low density aluminum metal for the piston plate assembly 56 helps to minimize unwanted oscillations of the gas flow control elements of the valve 10.

Control of variables of the system is accomplished through control of each of the valves 10 driven by the motor drives 32 which drive the shaft 30 coupled to the follower 28. In one form of the invention, a control system circuit, as shown in FIG. 7, provides control signals comprising digital pulses from the processor means, such as microprocessor 76. As shown in FIG. 7 the control system circuit comprises a backplane interface 78. In the preferred embodiment the backplane interface is an eight line parallel transceiver which enables bidirectional communication between the microprocessor 76 and monitoring and control signal sources, such as from a central control console. The control signals are derived from sensors used to sense selected pneumatic parameters, such as fluid flow rate, pressure or fluid momentum. In a preferred form of the invention, the parameters sensed are the same as the pneumatic system variables. However, in certain cases the pneumatic parameters sensed are not equivalent to the pneumatic variables, and a known correlation between the sensed parameters and the pneumatic variables enables control of the pneumatic variables without a direct measure thereof.

Temporary storage of data is accommodated by a number of buffers 82 which are coupled to program means, such as line cards (not shown) which store a predetermined set of operating values for the pneumatic variables. The program means also can be memory means, such as ROM or RAM, for storing data characteristic of the predetermined set of operating values. The memory means outputs such data to the microprocessor 76 for carrying out control of the valves 10. Responsive to the sensing signal output and the predetermined set of operating values from the program means, a control signal is generated by the microprocessor 76, the microprocessor 76 outputs the control signal to a valve interface 80 which includes phase drive circuitry, indicated generally at 84. The drive circuitry 84 provides phase control signals to enable applying a selected number of phases of power to the coils of the motor drive 32. Therefore, the control signals are output from the microprocessor 76, the signals are inverted and the current is boosted by signal inverters 85. The control signals from the microprocessor 76 are selectively input to the phase drive circuitry 84 which controls closure of one or more of the pairs of two-transistor gates on the input side of the drive circuitry 84. Responsive to the input signals the drive circuitry 84 outputs a phase signal voltage high to the selected coil or coils of the motor drives 32. Energization of each motor drive 32 is then accomplished by the microprocessor 76 providing an input to driver 86. The driver 86 in turn provides, on one or more of the six lines (pins 11-15 in FIG. 7), an enabling low signal to the selected ones of the motor drives 32. The phase signal voltage high from the phase drive circuitry 84 is therefore provided to the selected one of the coils 88 of the selected motor drive 32, and the circuit is connected effectively to ground by the presence of the enabling low signal from the driver 86. In the preferred embodiment six motor drives 32 are controlled by the valve interface 80 which comprises the associated phase drive circuitry 84 and the driver 86.

In a preferred form of the invention, selection of the motor drives 32 for operation is performed in a two-step process. The microprocessor 76 monitors the direction of travel of the motor drives 32, the absolute position for each of the motor drives 32 and the last time a given one of the valves 10 was moved. Therefore the microprocessor 76 determines a first one of the valves 10 which needs to be operated to meet the desired set of operating values for the pneumatic parameters in a part of the system associated with the selected valve 10. Secondly, the microprocessor 76 determines additional ones of the valves 10 to be slaved to the first valve by finding those valves which need to be operated in the same direction as the first valve 10. In a preferred form of the invention, the valves 10 are moved in one duty cycle increments, each duty cycle being approximately one second. Power is applied in 120 count increments per duty cycle to the selected coils of the motor drive 32. As a practical matter the first valve 10 commences operation before the additional ones of the valves 10, and therefore the additional valves are not operated a full duty cycle due to the time lag required for actuation of the additional valves 10. Furthermore, in this preferred embodiment, each of the valves 10 will be operated only if they have not been operated in an immediately previous duty cycle.

In this preferred embodiment, the power is applied to each half of each coil of the motor drives 32. Applying power for a total of 48 counts to the coils results in one revolution of the motor shaft. Therefore, counting means can be used to monitor the number of counts that power is applied to the motor coils. In this embodiment the microprocessor 76 operates the motor drives 32 in minimum amounts of 20 counts applied in five sets of four, i.e., five sets of counts, wherein each set applies a count to each phase or coil. If it is necessary to move the motor drives 32 more than the minimum 20 counts, it is done in alternate duty cycles so that power is applied in maximum 120 count increments.

In one form of the control system, the number of valves 10 selected for operation is limited by the residual power available from the main power supply for the pneumatic system. Therefore, in this embodiment, there is not a separate power supply for the control system. For example, a typical pneumatic system with a package of six of the control valves 10 may have sufficient residual power to operate three valves: the first selected valve and two more slaved to the first one. Simultaneous operation of a number of the valves 10 for one duty cycle results in minimizing disruption of pneumatic flow variables in the pneumatic system, rather than individual operation of each of the valves 10 to its end point followed by operation of the next valve. Furthermore, the use of residual power, as opposed to a dedicated power supply, reduces equipment and operating costs.

Calibration of each of the valves 10 is accomplished by operating each valve motor drive 32 to a known end point. In the invention this calibration is performed without risk of damaging the drive means, which includes the motor drive 32, the drive gear 42 and the driven gear 44. This calibration is achieved by applying to the motor coil a predetermined number of power phases less than is used in normal operation of the valve 10. For example, in a preferred form of the invention, only one phase of power is applied to the motor drive 32, resulting in a minimum amount of motor torque being used to reach the end point. Under such conditions of low motor torque, the prospects for overdriving the motor and causing damage to the motor or the gears is minimal.

The microprocessor 76 provides the necessary control signals to the motor drive 32 which results in a constant gas flow pressure output, a controlled changing output, or a combination of periods of constant pressure interspersed with periods of changing pressure. The microprocessor 76 also allows control of a plurality of flow control valves at the same location, or at different locations if the appropriate communication means is provided.

A listing for the code used in the microprocessor 76 is attached as Appendix A.

This invention overcomes a number of deficiencies and shortcomings of previous flow control systems by operating a plurality of the flow control valves simultaneously to minimize disruption of flow variables in the system, while using only residual power from the system to operate the valves. The invention also enables calibration of the flow valves by selectively driving each of the valves to an end point using less than the normal number of phases of power in order to avoid overdriving the valve motor and coupled valve drive assembly.

While there have been described herein various embodiments illustrative of the present invention, modifications will be apparent to those skilled in the art. Various features of the invention are defined in the appended claims.

```
** RSX-11M V4.1 **     [2,211]FRMOPO      - NO PAGE LIMIT     26-OCT-83     09:35:41
** RSX-11M V4.1 **     FORM #0 - NORMAL HARDWARE FORMS        26-OCT-83     09:35:41
** RSX-11M V4.1 **     NO IMPLIED FORM FEED                   26-OCT-83     09:35:41
** RSX-11M V4.1 **     DU0:[2,211]FRMOPO.TXT;12               26-OCT-83     09:35:41

CCC    222           222      1      1        ]]]
  C     2   2         2   2   11.    11           ]
  C         2             2    1      1           ]
  C        2       ..    2     1      1           ]
  C       2        .. .  2     1      1           ]
  C      2          ,    2     1      1           ]
  CCC   22222        ,   22222 111   111         ]]]

FFFFF  RRRR    M    M  OOOO   PPPP     OOO
  F      R   R   MM  MM  O   O  P   P   O   O
  F      R   R   M MM M  O   O  P   P   O   O
  FFFF   RRRR    M    M  O   O  PPPP    O   O
  F      R  R    M    M  O   O  P       O   O
  F      R   R   M    M  O   O  P       O   O
  F      R   R   M    M  OOOO   P        OOO

** RSX-11M V4.1 **     [2,211]FRMOPO      - NO PAGE LIMIT     26-OCT-83     09:35:41
** RSX-11M V4.1 **     FORM #0 - NORMAL HARDWARE FORMS        26-OCT-83     09:35:41
** RSX-11M V4.1 **     NO IMPLIED FORM FEED                   26-OCT-83     09:35:41
** RSX-11M V4.1 **     DU0:[2,211]FRMOPO.TXT;12               26-OCT-83     09:35:41

5.2  Internal Interrupt Routine
     This routine is entered on the timer interrupt.
     7 interrupts needed to complete one step
     On interrupts 0 through 7 one point will be examined per interrupt.
     On interrupt 6 the stepping is actualy performed.

IF none of the points are characterized
        Return from interrupt
     END IF
     IF interrupt count EC.6
        Process MOVE
     ELSE
        Calculate pointer to the current point data base from interrupt
           count and point count
     END IF
     IF point was moved in previous 120 step sequence
        Increment interrupt count
        Return from interrupt
     END IF
     IF three point are scheduled to move already
        Increment interrupt count
        Return from interrupt
     END IF
     IF point is not reset
        Process characterize point
     END IF
     IF the setpoint flag is set
        Process setpoint routine
     ELSE
        Increment interrupt count
        Return from interrupt
     END IF
```

CHARACTERIZE POINT

```
    IF point is at 0 count
        Indicate that point is reset
        Reduce speed to normal
        Increment interrupt count
        Return from intrerupt
    END IF
    IF this is the first point to move
        Store point's step count in master count location
        Indicate master point in common status
        Set direction "DOWN" in common status ELSE
        IF current point isn't on the same step count with master
            Increment interrupt count
            Return from interrupt
        END IF
        IF the master point is not performing reset
            Increment interrupt count
            Return from interrupt
        END IF
    END IF
    Adjust step and sequense counters
    Indicate direction in the local status
    Mark point's bit in the global "Points to be Moved" location
    Set high speed
    IF this point is the third one to be moved on this step
        Indicate that no more points allowed
    END IF
    Increment interrupt count
    Return from interrupt

SETPOINT PROCESS

IF 20 step sequence is finished
    IF the current sequence count EQU setpoint count
        Clear setpoint flag
        Increment interrupt count
        Return from Interrupt
    ELSE
        IF current count less then setpoint count
            Process Step UP
        ELSE
            Process Step Down
        END IF
    END IF
ELSE
    Continue the sequense (direction is indicated in points status)
END IF Step Up Process/Step Down Process IF this is the first point to move
      Store it's step count in global register
      Indicate global direction
      Indicate the master is found
  ELSE
      IF current point is not on the same count with the master
          Increment interrupt count
          Return from interrupt
      END IF
      IF master is performing reset
          Increment interrupt count
          Return
      END IF
      IF master is going in different direction
          Increment int. count
          Return
      END IF
```

```
            END IF
            Adjust point's counters
            Mark direction in the point status
            Set point's bit in the global "Motors to Move" register
            IF this point is the third one to be moved
                Indicate that no more points allowed
            END IF
            Increment int. count.
            Return

MOVE PROCESS

Deactivate Motor enable lines
            Deactivate Phase control lines
            IF at least one point is scheduled to move
                Activate motor enable lines for scheduled points
                IF reset is performed
                    Calculate phase sequence to go down with one phase from step
                       count
                ELSE
                    Calculate phase sequense according to direction
                END IF
                Output phase sequence
            END IF
            IF 120 step cycle is completed
                increment point count.
                DO for each point
                    IF motor was moved during previous cycle
                        Indicate it in the point's status
                    ELSE
                        Indicate that point is available for stepping
                    END IF
                END DO
            END IF
            Clear all global data base with exeption of the point count
            Reset interrupt count to 0
            Return from interrupt
```

What is claimed is:

1. A system for controlling variables of a pneumatic system by a plurality of motor driven valve means responsive to sensing of selected control system parameters, the system minimizing disruption of said variables while operating within maximum power consumption limits, comprising:
  program means for providing a predetermined set of operating values for said pneumatic parameters;
  means for sensing said selected parameters and providing a sensing signal output; and
  processor means for monitoring each of said plurality of valve means and for operating in a first direction a first one of said plurality of valve means for at least a portion of a predetermined duty cycle responsive to a comparison signal provided by comparing said sensing signal output with said predetermined set of operating values, and said processor means further selecting for operation in said first direction for at least a portion of the remainder of said predetermined duty cycle an additional predetermined maximum number of the valve means less than the plurality thereof, wherein operation of said first one and of said additional valve means continues to the end of said duty cycle unless said predetermined set of operating values is first attained.

2. The system of claim 1 including a stepping motor for operating each of said plurality of valve means.

3. The system of claim 2 wherein each of said stepping motors is a four phase stepping motor.

4. The system of claim 2 wherein said processor means prohibits operating any valve means in a duty cycle if said valve means had been moved in the immediately preceding predetermined duty cycle.

5. The system of claim 4 wherein said predetermined duty cycle comprises a one second time period, said processing means applying power in 120 counts per duty cycle to selective coils of said stepping motor.

6. The system of claim 5 wherein each count of power applied to said stepping motor produces a corresponding predetermined increment of rotation of the shaft of said stepping motor.

7. The system of claim 6 wherein one rotation of said stepping motor shaft results from 48 counts of power applied to said stepping motor.

8. The system of claim 1 wherein said plurality of valve means comprises six.

9. The system of claim 8 wherein said additional number of the valve means comprises two.

10. The system of claim 1 wherein said processor means comprises a microprocessor.

11. The system of claim 10 wherein said program means comprises computer software input to said microprocessor.

12. The system of claim 11 wherein said computer software comprises a time varying set of said operating conditions.

13. The system of claim 1 wherein said program means comprises manual input apparatus for input of said operating conditions.

14. The system of claim 1 wherein said sensing means comprises a fluid flow rate sensor.

15. The system of claim 1 wherein said sensing means comprises a pressure sensor.

16. The system of claim 1 wherein said sensing means comprises a fluid momentum sensor.

17. The system of claim 3 further characterized in that each of said additional valve means is controlled by said processor means provided said additional number of the valve means has not been operated in said first direction in an immediately previous predetermined duty cycle, said processing means applying power to each of said valve means when the phase of each of the motors of said valve means is identical to the phase of the motor of said first one of the valve means.

18. The system of claim 17 wherein said processing means controls the operation of predetermined numbered valve means that are to be driven in the direction opposite said first direction during the duty cycle immediately following the duty cycle where valve means are driven in said first direction.

19. The system of claim 2 wherein said processing means further includes counting means for determining total motor shaft rotation that is accomplished during successive duty cycles.

20. The system of claim 1 wherein said processor means includes multiplexer means for cyclically and sequentially sensing the direction of operation for each of said valve means.

21. The system of claim 3 wherein said processing means is operable to calibrate each of said valve means during a calibration mode, said processing means applying power to less than four of the phases of said stepping motor of said valve means to operatively drive each of said valve means to a known end point.

22. The system of claim 21 wherein said processing means applies power to one phase of said stepping motor.

23. A system for controlling variables of a pneumatic system by controlling a plurality of stepping motor driven valve means responsive to the sensing of selected control system parameters, the system being capable of minimizing disruption of said variables while operating within maximum power consumption limits, comprising:
memory means for storing a predetermined set of operating values for said parameters;
pneumatic sensors for sensing said selected parameters and providing a sensing signal output; and
processing means for monitoring each of said plurality of valve means and for operating in a first direction a first one of said plurality of valve means for at least a portion of a predetermined duty cycle responsive to a comparison signal provided by comparing said sensing signal output with said predetermined set of operating values, said processing means further selecting for operation in said first direction for at least a portion of the remainder of said predetermined duty cycle an additional predetermined maximum number of the valve means less than the plurality thereof, wherein operation of said first one and of said additional valve means continues to the end of said duty cycle unless said predetermined set of operating values is first attained.

24. A method for selectively operating a plurality of motor driven valve means for controlling variables in a pneumatic control system responsive to sensed parameters, the control system being capable of minimizing disruption of said pneumatic control system while operating within maximum power consumption limits, comprising:
monitoring sensed parameters associated with said pneumatic system to provide a sensing signal output;
comparing a predetermined set of operating values with said sensing signal output to provide a comparison output signal; and
operating in a selected direction a first one of the motor driven valve means for at least a portion of a predetermined duty cycle responsive to said comparison output signal, and also operating in said selected direction an additional predetermined maximum number of the valve means less than the plurality of valve means for at least a portion of the remainder of said predetermined duty cycle, wherein operation of said first one and of said additional valve means continues until attainment of said predetermined set of operating conditions.

25. A method for selectively controlling a plurality of motor driven pneumatic bidirectional valve means in a pneumatic control system that responds to sensed parameters, the method minimizing pneumatic disruption of the system while operating within maximum power consumption limits, comprising:
monitoring sensed parameters associated with said system to select valve means to be operated and operating said valve means until sensed parameters indicate further valve means operation is unnecessary;
operating a first one of said selected valve means in a first direction for at least a portion of a predetermined duty cycle, provided that the first selected valve means had not been operated in the immediately preceding duty cycle;
operating a predetermined maximum number of additional selected valve means in said first direction with said first selected valve means for at least a portion of the remainder of said predetermined duty cycle;
operating a selected valve means that is to be driven in the opposite direction in that opposite direction during at least a portion of a subsequent predetermined duty cycle;
operating a predetermined maximum number of additional selected valve means in said opposite direction with said selected opposite direction valve means for at least a portion of the remainder of said subsequent predetermined duty cycle.

* * * * *